(12) United States Patent
Sakai et al.

(10) Patent No.: US 10,302,439 B2
(45) Date of Patent: May 28, 2019

(54) DRIVING ASSISTANCE APPARATUS AND MOUNTING APPARATUS

(71) Applicant: DENSO CORPORATION, Kariya, Aichi-pref. (JP)

(72) Inventors: Hiroshi Sakai, Kariya (JP); Kenji Kobayashi, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 14 days.

(21) Appl. No.: 15/051,448

(22) Filed: Feb. 23, 2016

(65) Prior Publication Data
US 2016/0252904 A1  Sep. 1, 2016

(30) Foreign Application Priority Data
Feb. 27, 2015 (JP) .................... 2015-038707

(51) Int. Cl.
*B60W 30/00* (2006.01)
*G01C 21/34* (2006.01)
*G01C 21/36* (2006.01)

(52) U.S. Cl.
CPC ............ *G01C 21/34* (2013.01); *B60W 30/00* (2013.01); *G01C 21/3676* (2013.01)

(58) Field of Classification Search
None
See application file for complete search history.

(56) References Cited

U.S. PATENT DOCUMENTS

| 9,188,985 B1* | 11/2015 | Hobbs ............... G01C 21/34 |
| 2008/0262721 A1 | 10/2008 | Guo et al. |
| 2009/0169055 A1 | 7/2009 | Ishikawa |
| 2015/0112537 A1* | 4/2015 | Kawamata ............ G01C 21/34 701/23 |

FOREIGN PATENT DOCUMENTS

| JP | 2002-251700 | 9/2002 |
| JP | 2005-121562 A | 5/2005 |
| JP | 2005-165378 A | 6/2005 |
| JP | 2005-326265 A | 11/2005 |
| JP | 2007-114422 | 5/2007 |
| JP | 2007-248346 | 9/2007 |
| JP | 2008-009913 A | 1/2008 |
| JP | 2008-097514 A | 4/2008 |
| JP | 2008-267875 A | 11/2008 |
| JP | 2009-156784 A | 7/2009 |
| JP | 2010-128959 A | 6/2010 |
| JP | 2011-069665 | 4/2011 |
| JP | 2011-215474 A | 10/2011 |
| JP | 2012-155660 A | 8/2012 |

* cited by examiner

*Primary Examiner* — Jonathan M Dager
*Assistant Examiner* — Garrett F Evans
(74) *Attorney, Agent, or Firm* — Knobbe, Martens, Olson & Bear, LLP

(57) ABSTRACT

A driving assistance apparatus is mounted to a moving body. The driving assistance apparatus includes a processor. The processor is configured to set, by a setting unit, driving assistance, executed in the moving body, based on loaded map data stored in a first storage unit, and give, by a notifying unit, notification of execution suitability information related to whether or not the driving assistance set by the setting unit is executable. The execution suitability information indicates a result of determining whether or not the driving assistance is executable based on the loaded map data stored in the first storage unit.

15 Claims, 8 Drawing Sheets

DRIVING ASSISTANCE APPARATUS AND MOUNTING APPARATUS

CROSS-REFERENCE TO RELATED APPLICATION

This application is based on and claims the benefit of priority from Japanese Patent Application No. 2015-038707, filed Feb. 27, 2015. The entire disclosure of the above application is incorporated herein by reference.

BACKGROUND

Technical Field

The present disclosure relates to a driving assistance apparatus that is mounted to a moving body and a mounted apparatus.

Related Art

Conventionally, a driving assistance apparatus is known that is mounted to an own vehicle (refer to JP-A-2008-009913). The driving assistance apparatus performs automatic driving to a set destination as driving assistance. In this type of driving assistance apparatus, it is considered that setting of a route to the set destination is performed on the basis of map data stored in a storage unit which is mounted to the own vehicle.

However, the map data stored in the storage unit is not necessarily the latest data at all times, and may not match the actual road. Therefore, in the conventional driving assistance apparatus, when the map data stored in the storage unit does not match the actual road, driving assistance may be erroneously performed.

In other words, improvement in driving assistance safety is desired in driving assistance apparatuses.

SUMMARY

It is thus desired to provide a technology by which driving assistance safety is enhanced.

An exemplary embodiment of the present disclosure relates to a driving assistance apparatus that is mounted to a moving body. The driving assistance apparatus includes a processor.

The professor is configured to set, by a setting unit, driving assistance based on loaded map data stored in a first storage unit, and give, by a notifying unit, notification of execution suitability information related to whether or not the driving assistance is executable. The execution suitability information indicates a result of determining whether or not the driving assistance is executable based on the loaded map data stored in the first storage unit.

In the driving assistance apparatus, notification of the execution suitability information can be given. When the execution suitability information of which notification is given indicates that the driving assistance is not executable, the user of the driving assistance apparatus can stop execution of the driving assistance that is set.

Therefore, in the driving assistance apparatus, erroneous execution of driving assistance resulting from unsuitable map data can be reduced. In other words, in the driving assistance apparatus, driving assistance safety can be enhanced.

Another aspect of the present invention may be a mounted apparatus that is mounted to a moving body and includes an output unit. The output unit of the mounted apparatus outputs map revision information related to a revision in loaded map data stored in a first storage unit to an external apparatus.

In the mounted apparatus, map revision information related to a revision in the loaded map data can be outputted to an external apparatus. In addition, in the external apparatus at the output destination, the map revision information may be compared with the latest revision information of the latest map data stored in a second storage unit. Notification of the comparison result may be given by the mounted apparatus.

Thus, in the mounted apparatus, erroneous execution of driving assistance resulting from unsuitable map data can be reduced. In other words, in the driving assistance apparatus, driving assistance safety can be enhanced.

The reference numbers within the parentheses in the claims and the specification indicate corresponding relationships with specific means described according to embodiments, described hereafter, as an aspect, and do not limit the technical scope of the present disclosure.

DESCRIPTION OF THE EMBODIMENTS

Embodiments of the present disclosure will hereinafter be described with reference to the drawings.

First Embodiment

<Driving Assistance System>

Figure 1:
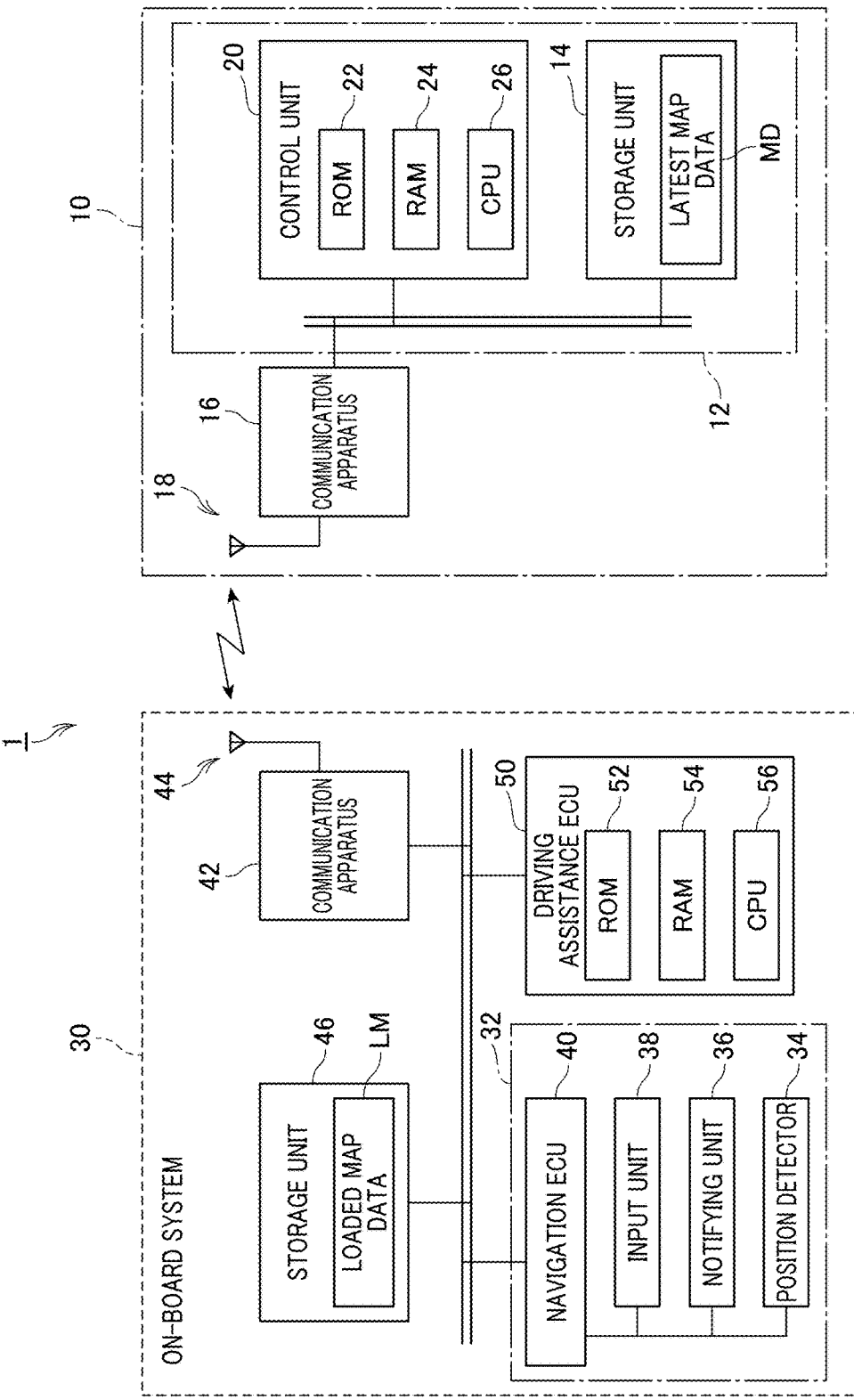
FIG. 1 is a block diagram of an overall configuration of a driving assistance system mainly configured by a driving assistance apparatus to which the present disclosure is applied.

A driving assistance system 1 shown in FIG. 1 is mounted to a four-wheel automobile (referred to, hereafter, as a moving body or an automobile or an own vehicle) and performs driving assistance based on map data. The driving assistance system 1 includes an infrastructure system 10 and an on-board system 30. The infrastructure system 10 corresponds to an external apparatus according to the embodiment. The on-board system 30 includes a driving assistance apparatus mounted to a moving body according to the embodiment.

According to the present embodiment, driving assistance performed by the driving assistance system 1 is presumed to be an automatic driving function. In the automatic driving function, the own vehicle is automatically driven to a destination set by the user based on a route (referred to, hereafter, as a planned travel route) to the destination. The automatic driving function is actualized by a plurality of functions for providing assistance in driving an automobile.

The plurality of functions composing the automatic driving function includes a steering angle control function, a vehicle speed control function, an acceleration and deceleration control function, a lane change function, and the like. The steering angle control function herein refers to a function for controlling the steering (steering angle) such as to follow the planned travel route. The vehicle speed control function refers to a function for controlling the speed of the own vehicle to a target vehicle speed. The acceleration and deceleration control function is a function for controlling acceleration and deceleration of the own vehicle. The lane change function is a function for changing the lane in which the own vehicle is traveling.

The infrastructure system 10 includes a server apparatus 12 and a communication apparatus 16.

The communication apparatus 16 performs wireless communication of information to and from the on-board system 30, via an antenna 18. For the communication of information via the communication apparatus 16, a known road and vehicle communication technique may be used. In particular, transmission of information from the communication apparatus 16 to the on-board system 30 may be actualized by a road traffic information communication system (vehicle information and communication system (VICS); registered trademark) that uses radio beacons or optical beacons.

The server apparatus 12 includes a storage unit 14 and a control unit 20.

The storage unit 14 is a known storage unit that is configured such that storage content therein is readable and writable. At least the latest map data MD is stored in the storage unit 14. The latest map data MD refers to map data indicating the latest state of roads and includes map configuration data, version data, and history data.

The map configuration data includes various types of data such as node data, link data, cost data, topographical data, mark data, intersection data, and facility data. Among these types of data, the node data indicates the longitude, latitude and altitude of each specific point on a road. The link data indicates each road (link) that connects the nodes. The cost data indicates unit cost assigned in advance to each link. The intersection data indicates the longitude, latitude, and altitude of each intersection. The facility data indicates the position and content of crosswalks, various signs, and the like placed on the road.

The version data is information (revision information) related to revisions of each piece of data configuring the map configuration data. The history data is a collection of information on the revision history of each piece of data composing the map configuration data and the content of the revision. The storage unit 14 is an example of a second storage unit.

The control unit 20 is a known control unit mainly configured by a known microcomputer that includes a read-only memory (ROM) 22, a random access memory (RAM) 24, and a central processing unit (CPU) 26.

The ROM 22 of the control unit 20 stores therein a processing program that enables the control unit 20 to execute a server process performed by the infrastructure system 10, among the processes required to actualize driving assistance (automatic driving function). In the server process, whether or not driving assistance can be executed on the vehicle in which the on-board system 30 is mounted is determined based on information from the on-board system 30. The determination result is transmitted to the on-board system 30 as execution suitability information.

<On-Board System>

Next, the on-board system 30 includes a navigation apparatus 32, a communication apparatus 42, a storage unit 46, and a driving assistance unit (referred to, hereafter, as a driving assistance electronic control unit (ECU)) 50.

The navigation apparatus 32 provides guidance on the route to the destination based on the planned travel route. The navigation apparatus 32 includes a position detector 34, a notifying unit 36, an input unit 38, and a navigation ECU 40.

The position detector 34 detects information required for detection of the current position and the orientation of the advancing direction of the own vehicle. The position detector 34 includes, for example, a known global positioning system (GPS) receiver, a gyro sensor, and a geomagnetic sensor.

The notifying unit 36 is a known unit that gives notification of information. The notifying unit 36 includes a display unit or a sound output unit. The input unit 38 is a known unit that receives input of information. The input unit 38 includes, for example, a known switch group, or a touch panel that is integrated with the display unit.

The navigation ECU 40 is a known electronic control unit that includes a ROM, a RAM, and a CPU. The navigation ECU 40 gives notification of the current position of the own vehicle and performs a navigation process to provide guidance on the route to the destination.

The storage unit 46 is a rewritable, non-volatile storage unit configured by, for example, a hard disk drive or a flash memory. The storage unit 46 stores therein loaded map data LM. The loaded map data LM is map data that is stored in the storage unit 46 and includes the map configuration data and the version data. The storage unit 46 is an example of a first storage unit.

The communication apparatus 42 performs communication of information with the infrastructure system 10. The communication of information by the communication unit 42 may be actualized by a known road and vehicle communication technique.

The driving assistance ECU 50 is a known control unit mainly configured by a known microcomputer that includes a ROM 52, a RAM 54, and a CPU 56. The ROM 52 stores therein data and programs of which the stored content is required to be held even when power is turned off. The RAM 54 temporarily stores therein data. The CPU 56 performs processes based on programs stored in the ROM 52 or the RAM 54. The driving assistance ECU 50 including the CPU 56 corresponds to a setting unit, a notifying unit, a change receiving unit, an output unit, a receiving unit, and a determination unit configured in a processor provided in a driving assistance apparatus mounted to a moving body according to the embodiment.

The ROM 52 of the driving assistance ECU 50 stores therein a processing program that enables the driving assistance ECU 50 to execute an on-board apparatus process performed by the on-board system 30, among the processes required to actualize driving assistance (automatic driving function).

In the on-board apparatus process, a comparison request is transmitted to the infrastructure system 10, together with the planned travel route and the version data of the map configuration data of the loaded map data LM corresponding to each zone configuring the planned travel route. The comparison request is a request for determination regarding whether or not restriction is applied to the execution of driving assistance. Furthermore, in the on-board apparatus process, the execution suitability information is received from the infrastructure system 10 and notification thereof is given.

<Server Process>

The server process performed by the control unit 20 of the server apparatus 12 is started when a startup command prescribed in advance is inputted.

Figure 2:
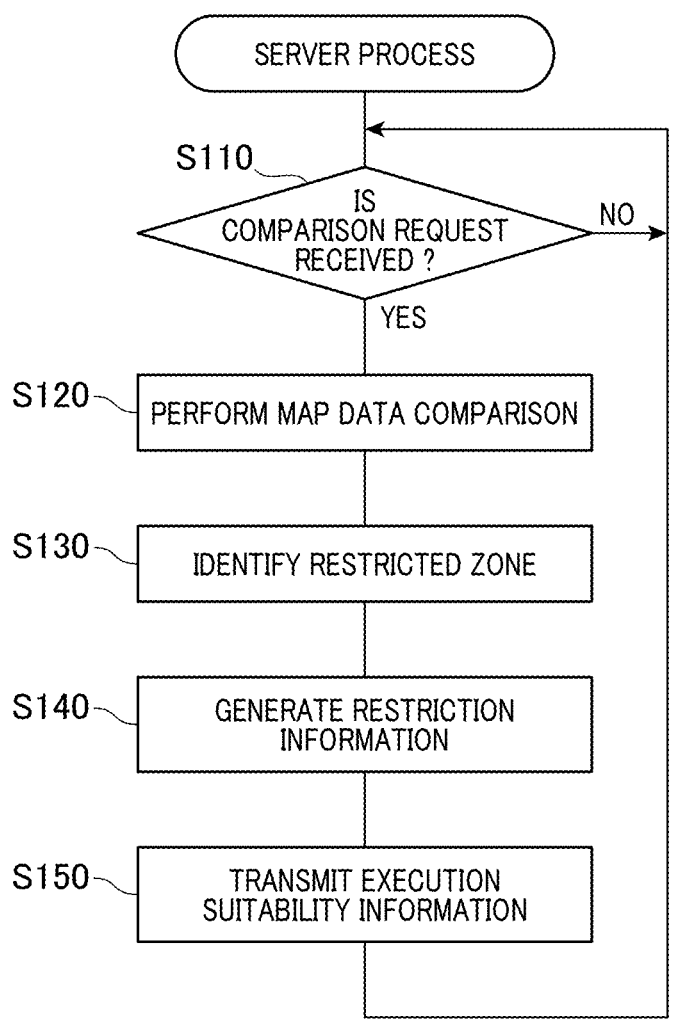
FIG. 2 is a flowchart of the processes in a server process performed by a server.

When the server process is started, as shown in FIG. 2, the control unit 20 determines whether or not the comparison request is received from the on-board system 30 (step S110). The comparison request herein includes, in addition to a determination request, the planned travel route, and the version data of the loaded map data LM The determination request includes a request for determination regarding whether or not restriction is applied to the execution of driving assistance. The version data of the loaded map data LM included in the comparison request is version data corresponding to the map configuration data in the loaded map data LM corresponding to each constituent zone composing the planned travel route.

The version data of the loaded map data LM included in the comparison request is an example of loaded data information.

As a result of the determination at step S110, when determined that the comparison request is not received (NO at step S110), the control unit 20 waits until the comparison request is received. When determined that the comparison request has been received (YES at step S110), the control unit 20 performs map data comparison (step S120). In map data comparison according to the present embodiment, the version data of the loaded map data LM is compared with the version data of the latest map data MD. The map data comparison according to the present embodiment is performed for each map configuration data corresponding to each constituent zone of the planned travel route.

The version data of the latest map data MD that is subjected to map data comparison is an example of the latest data information.

Next, the control unit 20 identifies a restricted zone and an executable zone based on the result of map data comparison performed at step S120 (step S130). The restricted zone referred to herein is information indicating a zone in which restriction is applied to the execution of driving assistance. In addition, the executable zone is information indicating a zone within the planned travel route in which driving assistance can be executed without restriction applied thereto.

Specifically, at step S130 according to the present embodiment, the control unit 20 identifies, as the restricted zone, a constituent zone on the planned travel route that corresponds to map configuration data that has been updated from the map configuration data in the loaded map data LM, within the map configuration data of the latest map data MD. In addition, at step S130 according to the present embodiment, the control unit 20 identifies, as the executable zone, a constituent zone on the planned travel route that corresponds to map configuration data that is not updated from the loaded map data LM, within the map configuration data of the latest map data MD, as a result of map data comparison.

Furthermore, in the server process, the control unit 20 generates restriction information based on history data (step S140). The restriction information referred to herein is information indicating the content of a function for restricting the execution of driving assistance in the restricted zone.

Specifically, at S140 according to the present embodiment, when the content of the update from the loaded map data LM to the latest map data MD in the restricted zone is an increase or decrease in the number of lanes, stopping the execution of driving assistance itself in the restricted zone may be generated as the restriction information.

In addition, for example, when the content of the update from the loaded map data LM to the latest map data MD in the restricted zone is a newly constructed or eliminated branching or merging point, or a change in the type of lane marking, stopping the execution of the lane change function in the restricted zone may be generated as the restriction information. Furthermore, for example, when the content of the update from the loaded map data LM to the latest map data MD in the restricted zone is a newly installed road sign, stopping the execution of the vehicle speed control function and the acceleration and deceleration control function in the restricted zone may be generated as the restriction information.

In addition, in all constituent zones of the planned travel route, when no update is made from the loaded map data LM to the latest map data MD, execution of all functions composing driving assistance, that is, no restrictions, may be generated as the restriction information.

Next, in the server process, the control unit 20 transmits the result of the server process, that is, the execution suitability information to the on-board system 30 (step S150). The execution suitability information transmitted at S150 includes the executable zone, the restricted zone, and the restriction information.

Subsequently, the control unit 20 returns the present server process to step S110.

In other words, in the present server process, whether or not driving assistance can be executed on the vehicle in which the on-board system 30 is mounted is determined based on information from the on-board system 30. The determination result is transmitted to the on-board system 30 as the execution suitability information.

<On-Board Apparatus Process>

The on-board apparatus process performed by the driving assistance ECU 50 is started when a startup command prescribed in advance is inputted. The startup command herein may be an ignition signal or may be a signal indicating that a prescribed switch has been operated.

Figure 3:
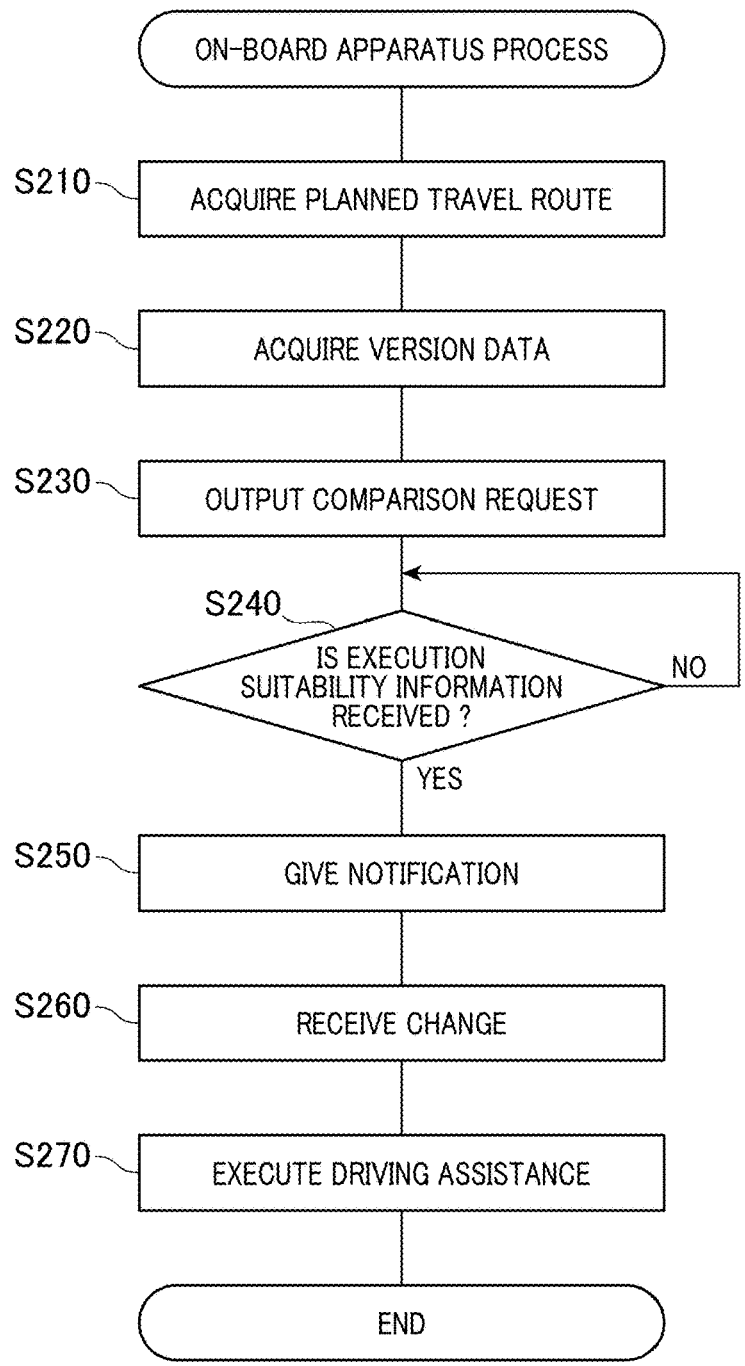
FIG. 3 is a flowchart of the processes in an on-board apparatus process according to a first embodiment.

Then, when the on-board apparatus process is started, as shown in FIG. 3, the driving assistance ECU 50 first acquires the planned travel route that has been set, via the navigation apparatus 32 (step S210). Next, the driving assistance ECU 50 acquires the version data corresponding to the map configuration data in the loaded map data LM corresponding to each constituent zone composing the planned travel route acquired at step S210 (step S220). That is, at step S220 according to the present embodiment, the version data of the map configuration data (for example, the link data and the node data) corresponding to each road composing the planned travel route is acquired.

Furthermore, in the on-board apparatus process, the driving assistance ECU 50 outputs the comparison request to the communication unit 42 (step S230). The comparison request is then transmitted to the infrastructure system 10 via the communication unit 42. The comparison request transmitted to the infrastructure system 10 includes, in addition to the determination request, the planned travel route acquired at step S210 and the version data acquired at step S220.

Next, in the on-board apparatus process, the driving assistance ECU 50 determines whether or not the execution suitability information is received from the infrastructure system 10 (step S240). As a result of the determination at step S240, when determined that the execution suitability information is not received (NO at step S240), the driving assistance ECU 50 waits until the execution suitability information is received.

Then, when determined that the execution suitability information is received (YES at step S240), the driving assistance ECU 50 gives notification that the execution suitability information is received (step S250). The notification herein includes outputting the execution suitability information by sound from the sound output unit and displaying the execution suitability information in the display unit of the notifying unit 36 of the navigation apparatus 32.

Figure 4:
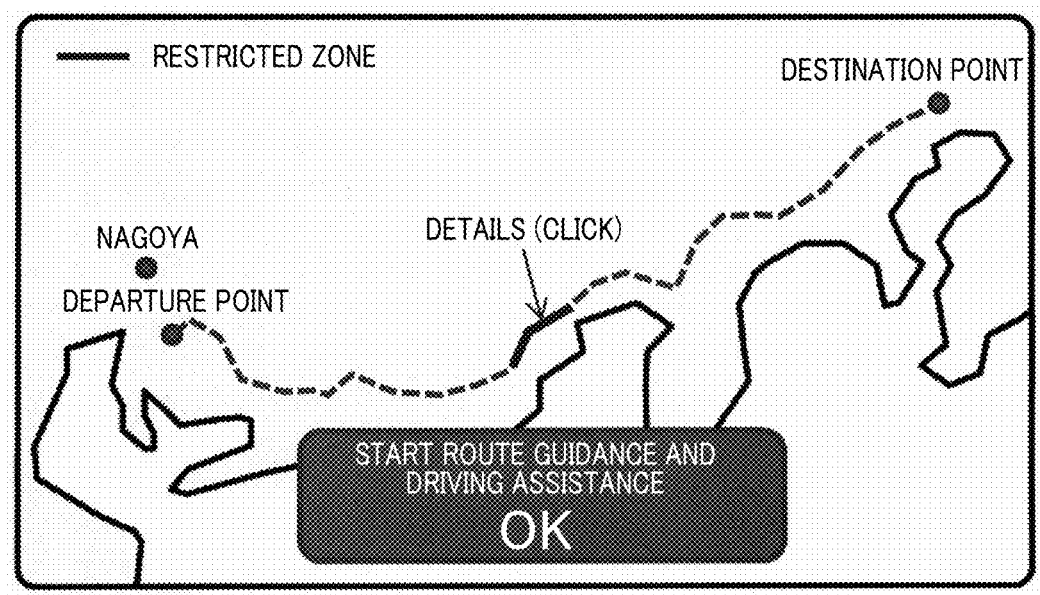
FIG. 4 is an explanatory diagram of a mode of notification in the on-board apparatus process.
Figure 5:
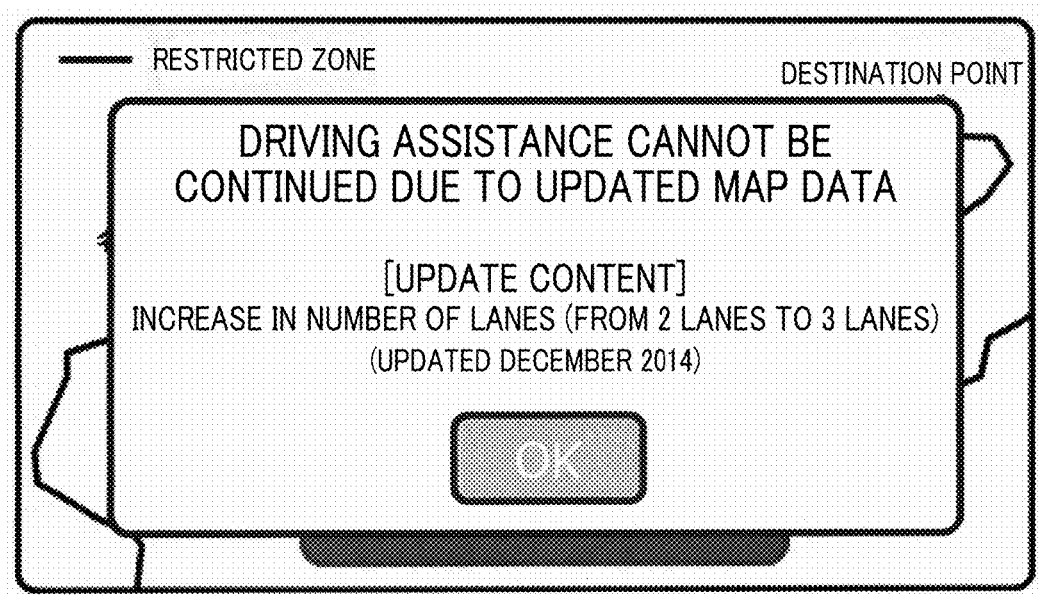
FIG. 5 is an explanatory diagram of a mode of notification in the on-board apparatus process.

Of the notifications, as shown in FIG. 4, display of the execution suitability information in the display unit includes display in a mode in which the executable zone and the restricted zone are discernable on the planned travel route. As shown in FIG. 5, the display of the restricted zone may also contain a warning that restriction is applied to the execution of driving assistance. Specifically, at step S250 according to the present embodiment, notification of the restriction information is given as the warning that restriction is applied to the execution of driving assistance. According to the present embodiment, the warning that restriction is applied to the execution of driving assistance may be issued when the restricted zone displayed in the display unit is selected.

Figure 6:
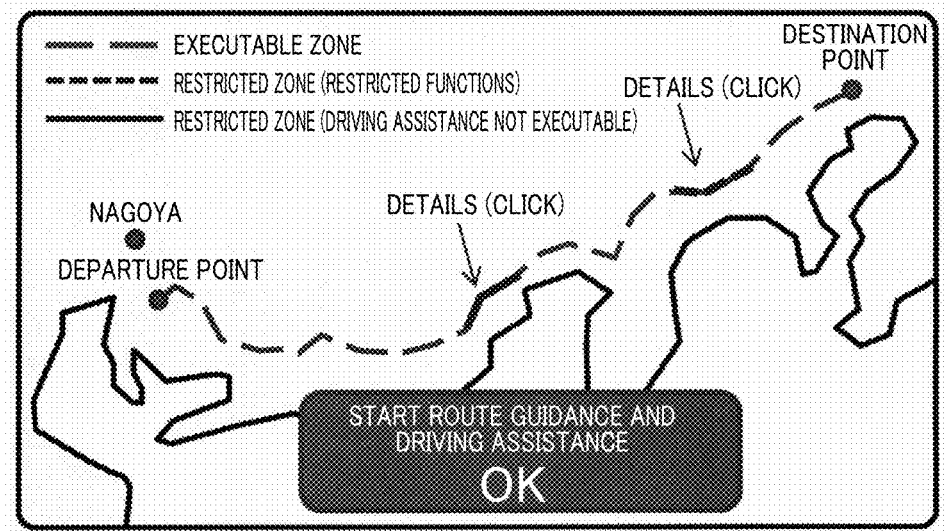
FIG. 6 is an explanatory diagram of a mode of notification in the on-board apparatus process.
Figure 7:
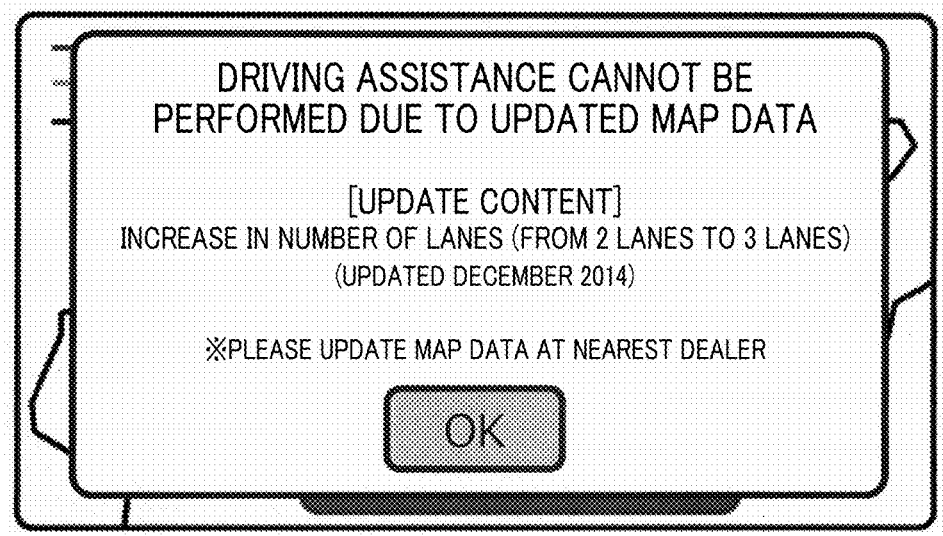
FIG. 7 is an explanatory diagram of a mode of notification in the on-board apparatus process.
Figure 8:
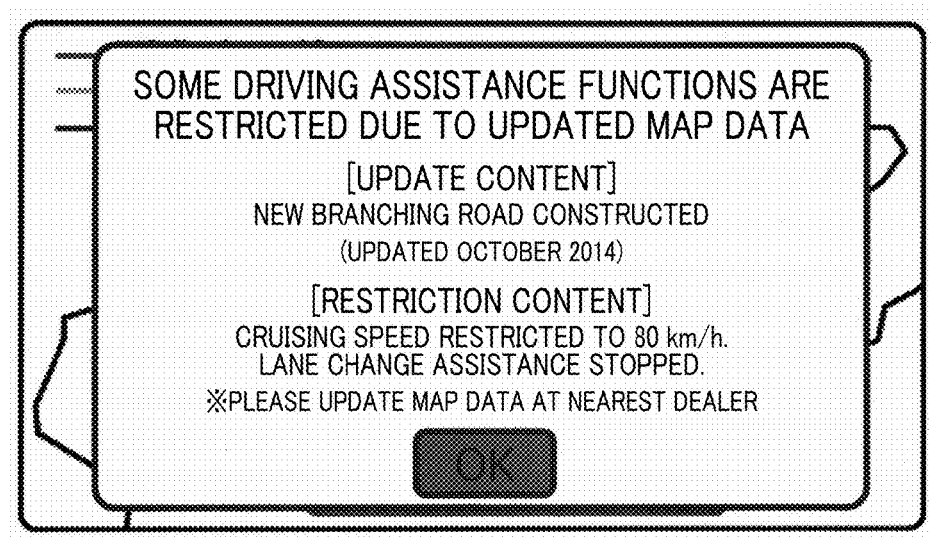
FIG. 8 is an explanatory diagram of a mode of notification in the on-board apparatus process.

According to the present embodiment, as shown in FIG. 6, the restricted zone may be displayed in a mode enabling the restricted zone to be differentiated based on the content of the restriction information. In this case, as shown in FIG. 7 and FIG. 8, when a restricted zone displayed in the display unit is selected, the restriction information corresponding to the selected restricted zone may be displayed.

Next, in the on-board apparatus process, the driving assistance ECU 50 receives change in driving assistance setting (step S260). At step S260 according to the present embodiment, the driving assistance ECU 50 receives, as a change in driving assistance setting, stopping of the execution of driving assistance in the restricted zone, that is, the driver themselves must drive the own vehicle in the restricted zone.

Furthermore, in the on-board apparatus process, the driving assistance ECU 50 performs driving assistance of the content that is currently set (step S270).

Then, the driving assistance ECU 50 ends the present on-board apparatus process.

In other words, in the on-board apparatus process, the comparison request is transmitted to the infrastructure system 10 together with the version data. Furthermore, in the on-board apparatus process, the execution suitability information is received from the infrastructure system 10 and notification of the received execution suitability information is given. In addition, in the on-board apparatus process, driving assistance is performed based on the notification content.

Effects According to the Embodiment

As described above, in the on-board system 30, notification of the execution suitability information can be given. When the execution suitability information in the notification indicates that execution of driving assistance is not possible, the user of the on-board system 30 can stop the execution of driving assistance that is set.

Therefore, in the on-board system 30, erroneous execution of driving assistance resulting from the loaded map data LM not being the latest map data MD can be reduced. In other words, in the driving assistance ECU 50, driving assistance safety can be enhanced.

In addition, in the on-board apparatus process according to the present embodiment, notification of the presence of a restricted zone is given. Therefore, the user of the on-board system 30 can recognize the presence or absence of a restricted zone.

Furthermore, in the on-board apparatus process, notification is given of the restriction information corresponding to each restricted zone, that is, the details of the restricted zone. Therefore, the user of the on-board system 30 can know the content of the restricted zone and can know the reason for the restriction to driving assistance and the like.

In the on-board apparatus process according to the present embodiment, notification of the executable zone is given. Therefore, the user of the on-board system 30 can recognize the presence or absence of the executable zone.

Second Embodiment

A driving assistance system according to a second embodiment mainly differs from the driving assistance system 1 according to the first embodiment in terms of the processing content of the on-board apparatus process performed by the driving assistance ECU 50. Therefore, according to the present embodiment, configurations and processes that are similar to those according to the first embodiment are given the same reference numbers. Descriptions thereof are omitted. The on-board apparatus process differing from that according to the first embodiment will mainly be described.

<On-Board Apparatus Process>

The on-board apparatus process according to the present embodiment is started when a startup command prescribed in advance is inputted. The startup command herein may be an ignition signal or may be a signal indicating that a dedicated switch has been operated.

Figure 9:
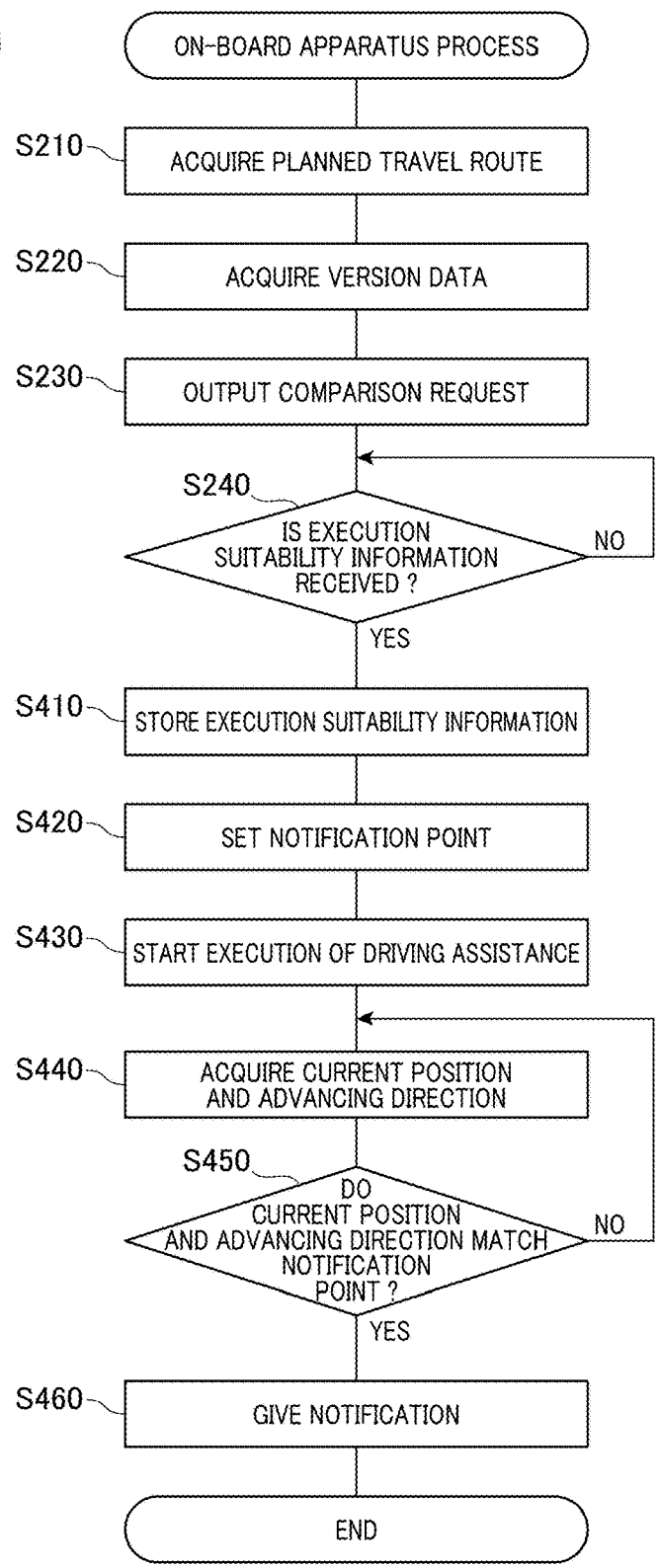
FIG. 9 is a flowchart of the processes in an on-board apparatus process according to a second embodiment.

When the on-board apparatus process is started, as shown in FIG. 9, the driving assistance ECU 50 first acquires the planned travel route that has been set, via the navigation apparatus 32 (step S210). Next, the driving assistance ECU 50 acquires the version data corresponding to the map configuration data in the loaded map data LM corresponding to each constituent zone composing the planned travel route acquired at step S210 (step S220).

Furthermore, in the on-board apparatus process, the driving assistance ECU 50 outputs the comparison request to the communication unit 42 (step S230).

Next, in the on-board apparatus process, the driving assistance ECU 50 determines whether or not the execution suitability information is received from the infrastructure system 10 (step S240). As a result of the determination at step S240, when determined that the execution suitability information is not received (NO at step S240), the driving assistance ECU 50 waits until the execution suitability information is received.

Then, when determined that the execution suitability information is received (YES at step S240), the driving assistance ECU 50 stores the received execution suitability information (step S410). The storage destination of execution suitability information according to the present embodiment may be the storage unit 46 or the RAM 54 of the driving assistance ECU 50.

Next, the driving assistance ECU 50 sets a notification point based on each restricted zone included in the execution suitability information stored at step S410 (step S420). The notification point referred to herein is to a point on the planned travel route for which information related to a restriction zone is given. The notification point includes the advancing direction at each point, in addition to the coordinates (such as the longitude and latitude) of each point.

Specifically, the notification point may be a point indicating the starting position itself of the restricted zone, or may be a point near the departure point by a distance prescribed in advance from the starting position of the restricted zone. Here, a fixed distance itself may be prescribed in advance. Alternatively, a distance over which the own vehicle is able to travel during a prescribed amount of time at a certain speed may be set. Still further, the setting of the notification point is not limited to the above-described method. The notification point may be set in any manner as long as the notification point is set such that notification of the restricted zone is given when the own vehicle approaches the restricted zone on the planned travel route.

Furthermore, in the on-board apparatus process, the driving assistance ECU 50 starts the execution of driving assistance of the content that is currently set (step S430).

Next, the driving assistance ECU 50 acquires the current position of the own vehicle and the advancing direction of the own vehicle via the position detector 34 of the navigation apparatus 32 (step S440).

Then, the driving assistance EU 50 determines whether or not the current position and advancing direction of the own vehicle acquired at step S440 match a notification point (step S450). Match herein includes the own vehicle being within a range of error prescribed in advance, in addition to an exact match.

As a result of the determination at S450, when determined that the current position and advancing direction of the own vehicle do not match a notification point (NO at step S450), the driving assistance ECU 50 waits until the current position and advancing direction of the own vehicle match a notification point, while continuing the execution of driving assistance. Then, when determined that the current position and advancing direction of the own vehicle match a notification point, that is, when determined that the own vehicle has reached a notification point (YES at step S450), the driving assistance ECU 50 gives notification of a warning that restriction is applied to the execution of driving assistance (step S460).

In addition, the warning that restriction is applied to the execution of driving assistance may be the restriction information itself or a warning based on the restriction information. The warning based on the restriction information referred to herein includes, for example, a warning that the execution of driving assistance will be stopped.

The notification given at S460 is, for example, a display in the display unit of the notifying unit 36. According to the present embodiment, the mode of display of the warning that restriction is applied to the execution of driving assistance may be similar to the modes for display according to the first embodiment.

Subsequently, the driving assistance ECU 50 ends the on-board apparatus process.

In other words, in the on-board apparatus process, the notification point is set on the planned travel route based on the execution suitability information. When the own vehicle arrives at the notification point, the execution of driving assistance is ended upon notification of the restriction information corresponding to the notification point.

Effects According to the Second Embodiment

In the on-board apparatus process according to the present embodiment, the timing at which notification of the restriction information is given can be set to the timing at which the own vehicle arrives at the notification point corresponding to the restriction information.

As a result, in the on-board apparatus process, the content of the restricted zone can be recognized when the own vehicle approaches the restricted zone, and the user can be prompted to make a more appropriate response.

Other Embodiments

The embodiments of the present disclosure are described above. However, the present disclosure is not limited to the above-described embodiments. Various embodiments are possible without departing from the spirit of the present disclosure.

For example, according to the above-described embodiments (first embodiment and second embodiment), map data comparison is performed in the infrastructure system 10. However, in the present disclosure, the subject performing the map data comparison is not limited to the infrastructure system 10. That is, in the present disclosure, the subject performing the map data comparison may be the on-board system 30.

Figure 10:
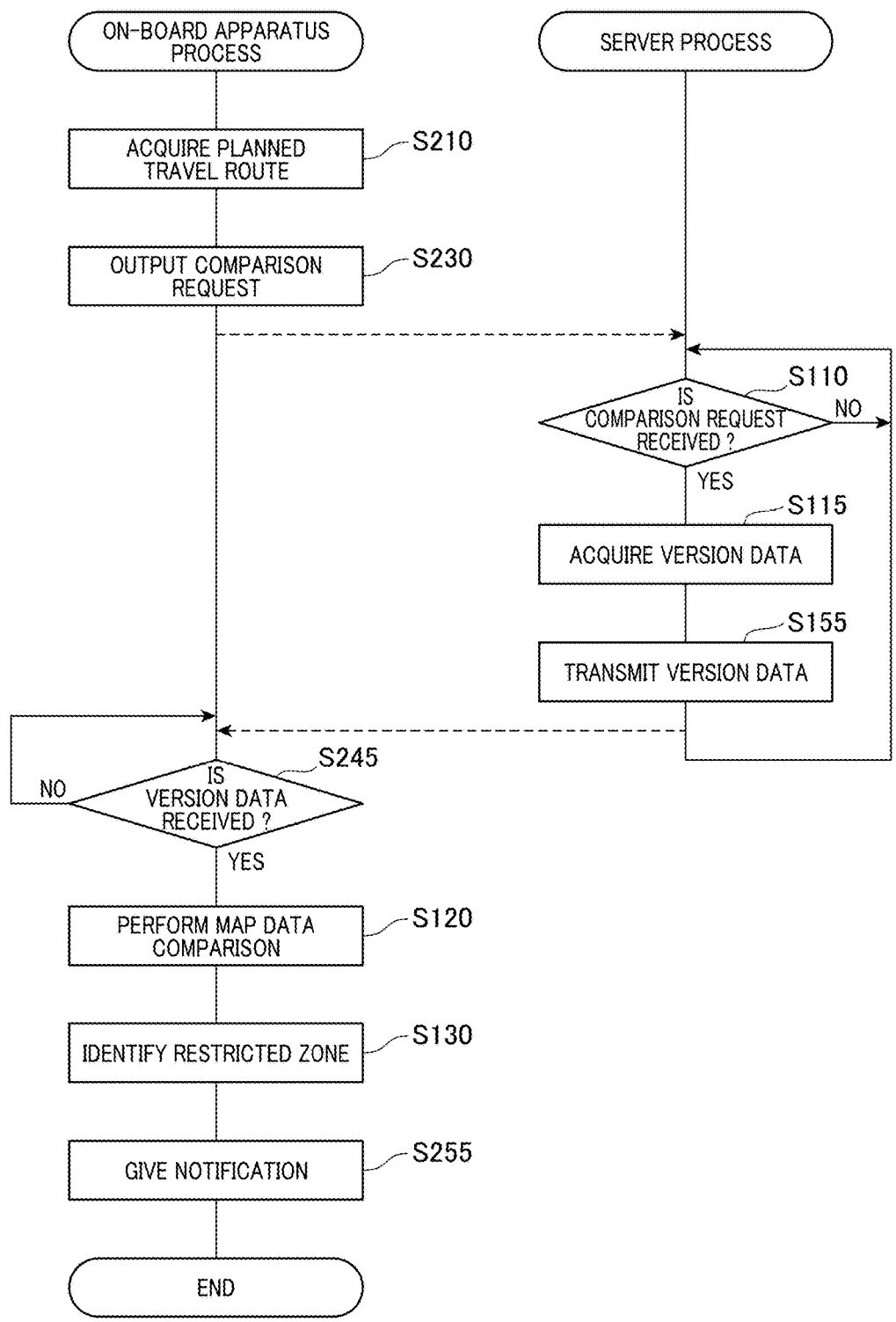
FIG. 10 is a flowchart of the processes in a variation example of the on-board apparatus process and the server process.

In this case, the on-board apparatus process and the server process may be configured as shown in FIG. 10. The processes shown in FIG. 10 differ from the on-board apparatus process and the server process according to the above-described embodiments only in terms of some of the steps. Therefore, process content that is the same as that according to the above-described embodiments is given the same reference number. Description thereof is omitted.

As shown in FIG. 10, in the on-board apparatus process, the driving assistance ECU 50 acquires the planned travel route (step S210) and outputs the comparison request to the communication unit 42 (step S235). The comparison request transmitted at step S235 includes the planned travel route acquired at step S210, in addition to the determination request.

Meanwhile, in the server process, when determined that the comparison request is received from the on-board system 30 (YES at step S110), the control unit 20 acquires the version data of the latest map data MD corresponding to each constituent zone of the planned travel route included in the comparison request from the on-board system 30 (step S115). Furthermore, in the server process, the control unit 20 transmits the version data acquired at step S120 to the on-board system 30 (step S155).

Then, in the on-board apparatus process, when determined that the version data is received from the infrastructure system 10 (YES at step S245), the driving assistance ECU 50 performs map data comparison (step S120). Furthermore, in the on-board apparatus process, the driving assistance ECU 50 identifies the restricted zone and the allowable zone based on the result of map data comparison performed at step S120 (step S130). The driving assistance ECU 50 gives notification of the result of map data comparison as the execution suitability information (step S255).

In the driving assistance system that performs such on-board apparatus process and server process as well, effects similar to those of the driving assistance system 1 according to the above-described embodiments can be achieved.

Furthermore, when the subject performing map data comparison is the on-board system 30, the on-board process may be configured as shown in FIG. 9, instead of the process shown in FIG. 10.

In addition, in the above-described case, the data transmitted from the infrastructure system 10 to the on-board system 30 is not limited to the version data and may be the latest map data MD itself. In this case, in map data comparison, the map configuration data in the loaded map data LM may be compared with the map configuration data in the latest map data MD.

In addition, in the on-board apparatus process according to the above-described embodiments, the comparison request transmitted from the on-board system 30 to the infrastructure system 10 includes the planned travel route, in addition to the determination request. However, the information included in the comparison request is not limited to the planned travel route. For example, the information included in the comparison request transmitted from the on-board system 30 to the infrastructure system 10 may include a destination set via the navigation apparatus 32 instead of the planned travel route. In this case, setting of the route to the destination (that is, the planned travel route) may be performed by the infrastructure system 10.

Furthermore, the notifying unit 35 according to the above-described embodiments is provided such as to be shared with the navigation apparatus 32. However, in the present disclosure, the notifying unit 36 may be provided such as to be dedicated to the driving assistance system 1.

According to the above-described embodiments, the automatic driving function is presumed as driving assistance performed by the driving assistance system 1. However, driving assistance performed by the driving assistance system 1 is not limited thereto. Driving assistance performed by the driving assistance system in the present disclosure may be any type as long as driving assistance is a function for providing assistance in driving of a moving body. Of the plurality of functions composing the automatic driving function, driving assistance may be the steering angle control function, the lane keeping function, or the lane change function alone. Furthermore, driving assistance performed by the driving assistance system in the present disclosure may be a light distribution control function for controlling the distribution of light from the headlights, a parking assistance function for providing assistance in parking in a parking space, and the like.

In addition, according to the above-described embodiments, the subject in which the system including the driving assistance ECU 50 is mounted is presumed to be a four-wheel automobile. However, in the present disclosure, the subject in which the system including the driving assistance ECU 50 is mounted is not limited thereto. That is, the subject in which the system including the driving assistance ECU 50 is mounted may be a two-wheel automobile, a train, a ship, or an aircraft, as long as the subject is a moving body.

The embodiments of the present disclosure also include embodiments in which some of the configurations according to the above-described embodiments are omitted. In addition, the embodiments of the present disclosure also include embodiments in which the above-described embodiments are combined, as appropriate, with variation examples. Furthermore, the embodiments of the present disclosure include any embodiment conceivable without departing from the essence of the present disclosure specified by the wording recited in the claims The present disclosure can also be actualized by various modes in addition to the above-described driving assistance apparatus, such as a mounted apparatus that outputs version information of the loaded map data LM, a program executed by a computer to perform driving assistance, and a driving assistance control method for performing driving assistance.

What is claimed is:

1. A driving assistance apparatus that is mounted to a moving body, the driving assistance apparatus comprising:
   a processor configured to:
   set, by a setting unit, driving assistance including a plurality of functions, executed in the moving body, based on loaded map data stored in a first storage unit; and
   give, by a notifying unit, notification of execution suitability information related to whether or not the driving assistance set by the setting unit is executable, the execution suitability information indicating a result of determining whether or not the driving assistance is executable based on the loaded map data stored in the first storage unit;
   give, by the notifying unit, notification of, as the execution suitability information, presence or absence of a restricted zone in which execution of the driving assistance set by the setting unit is restricted;
   display the execution suitability information in a display unit provided in the notifying unit in a mode in which an executable zone and a restricted zone are discernable on a route from a departure point to a destination point, the executable zone indicating a zone within the route in which driving assistance is executed without restriction applied to execution of the driving assistance, the restricted zone indicating a zone in which restriction is applied to execution of driving assistance;
   generate restriction information indicating content of a function among the plurality of functions for restricting execution of the driving assistance in the restricted zone, based on history data including content of updates of map data from the loaded map data to latest map data in the restricted zone; and
   display the restriction information in the display unit such that the restricted zone, comprising a plurality of zones having different content of the restriction information, is displayed in a mode enabling the plurality of zones of the restricted zone to be differentiated from one another based on the content of the restriction information.

2. The driving assistance apparatus according to claim 1, wherein
   the processor is configured to give, by the notifying unit, notification of, as the execution suitability information, a content of a restricted zone in which execution of the driving assistance is restricted among zones in which execution of the driving assistance set by the setting unit is planned.

3. The driving assistance apparatus according to claim 1, wherein
   the processor is configured to give, by the notifying unit, notification of, as the execution suitability information, a content of an allowable zone in which execution of the driving assistance is not restricted among zones in which execution of the driving assistance set by the setting unit is planned.

4. The driving assistance apparatus according to claim 1, wherein the processor is configured to receive, by a change receiving unit included in the setting unit, a change of setting of the driving assistance when notification of the execution suitability information is given by the notifying unit.

5. The driving assistance apparatus according to claim 1, wherein
the execution suitability information in the notification given by the notifying unit is information based on an execution result of map data comparison that compares loaded data information related to the loaded map data stored in the first storage unit with latest data information related to latest map data.

6. The driving assistance apparatus according to claim 5, wherein
the processor is configured to:
output, by an output unit, the loaded data information; and
receive, by a receiving unit, specific information from an external apparatus that has acquired the loaded data information outputted from the output unit.

7. The driving assistance apparatus according to claim 6, wherein
the loaded data information outputted from the output unit is revision information of the loaded map information, and
the processor is configured to:
receive, by the receiving unit, as the specific information, execution suitability information that is set, by the setting unit, based on an execution result of map data comparison executed by the external apparatus that compares the loaded data information outputted from the output unit with latest revision information of latest map data stored in a second storage unit configured in the external apparatus; and
give, by the notifying unit, notification of, as the execution suitability information, the specific information received by the receiving unit.

8. The driving assistance apparatus according to claim 6, wherein
the loaded data information outputted by the output unit is information indicating zones in which execution of the driving assistance is planned, and
the processor is configured to:
receive, by the receiving unit, as the specific information, latest revision information in the zones in which execution of the driving assistance is planned, among revision information of latest map data store in a second storage unit;
execute, by a determination unit, map data comparison that compares the latest revision information received by the receiving unit with revision information in the zones in which execution of the driving assistance is planned, among revision information of loaded map data stored in the first storage unit; and
give, by the notifying unit, as the execution suitability information, a result of the map data comparison executed by the determination unit.

9. The driving assistance apparatus according to claim 6, wherein
the processor is configured to output, by the output unit, the loaded data information using road and vehicle communication.

10. The driving assistance apparatus according to claim 1, wherein the processor is configured to give, by the notifying unit, notification of the execution suitability information before execution of the driving assistance is started.

11. The driving assistance apparatus according to claim 1, wherein
the processor is configured to give, by the notifying unit, notification of the execution suitability information, after execution of the driving assistance set by the setting unit is started, and when the moving body reaches a position within a range of a condition prescribed from a starting position of a restricted zone in which execution of the driving assistance is restricted.

12. The driving assistance apparatus according to claim 1, wherein
the driving assistance set by the setting unit includes a plurality of functions, and
the execution suitability information includes information related to a function of which execution is restricted, among the plurality of functions included in the driving assistance.

13. A mounted apparatus that is mounted to a moving body, the mounted apparatus comprising:
a processor configured to:
output, by an output unit, information related to a revision in loaded map data stored in a first storage unit to an external apparatus;
set, by a setting unit, driving assistance including a plurality of functions, executed in the moving body, based on the loaded map data stored in the first storage unit;
give, by a notifying unit, notification of execution suitability information related to whether or not the driving assistance set by the setting unit is executable, the execution suitability information indicating a result of determining whether or not the driving assistance is executable based on the loaded map data stored in the first storage unit;
give, by the notifying unit, notification of, as the execution suitability information, presence or absence of a restricted zone in which execution of the driving assistance set by the setting unit is restricted;
display the execution suitability information in a display unit provided in the notifying unit in a mode in which an executable zone and a restricted zone are discernable on a route from a departure point to a destination point, the executable zone indicating a zone within the route in which driving assistance is executed without restriction applied to execution of the driving assistance, the restricted zone indicating a zone in which restriction is applied to execution of driving assistance;
generate restriction information indicating content of a function among the plurality of functions for restricting execution of the driving assistance in the restricted zone, based on history data including content of updates of map data from the loaded map data to latest map data in the restricted zone; and
display the restriction information in the display unit such that the restricted zone comprising a plurality of zones having different content of the restriction information is displayed in a mode enabling the plurality of zones in the restricted zone to be differentiated from one another based on the content of the restriction information.

14. The mounted apparatus according to claim 13, wherein the processor is configured to output, by the output unit, the information related to the revision in loaded map data to the external apparatus that acts as an apparatus that compares the information related to the revision in loaded map data outputted from the output unit with latest revision information of latest map data stored in a second storage unit.

15. A driving assistance method comprising:

setting, by a setting unit configured in a processor provided in a driving assistance apparatus mounted to a moving body, driving assistance including a plurality of functions, executed in the moving body, based on loaded map data stored in a first storage unit; and giving, by a notifying unit configured in the processor, notification of execution suitability information related to whether or not the driving assistance set by the setting unit is executable, the execution suitability information indicating a result of determining whether or not the driving assistance is executable based on the loaded map data stored in the first storage unit;

giving, by the notifying unit, notification of, as the execution suitability information, presence or absence of a restricted zone in which execution of the driving assistance set by the setting unit is restricted;

displaying the execution suitability information in a display unit provided in the notifying unit in a mode in which an executable zone and a restricted zone are discernable on a route from a departure point to a destination point, the executable zone indicating a zone within the route in which driving assistance is executed without restriction applied to execution of the driving assistance, the restricted zone indicating a zone in which restriction is applied to execution of driving assistance;

generating restriction information indicating content of a function among the plurality of functions for restricting execution of the driving assistance in the restricted zone, based on history data including content of updates of map data from the loaded map data to latest map data in the restricted zone; and displaying the restriction information in the display unit such that the restricted zone, comprising a plurality of zones having different content of the restriction information, is displayed in a mode enabling the plurality of zones in the restricted zone to be differentiated from one another, based on the content of the restriction information.

* * * * *